US 12,377,723 B2

(12) United States Patent
Andersson et al.

(10) Patent No.: US 12,377,723 B2
(45) Date of Patent: Aug. 5, 2025

(54) NOISE MANAGEMENT IN ELECTRIC HEAVY VEHICLES

(71) Applicant: Volvo Truck Corporation, Gothenburg (SE)

(72) Inventors: Arne Andersson, Mölnlycke (SE); Mats Fagergren, Kungälv (SE)

(73) Assignee: Volvo Truck Corporation, Gothenburg (SE)

( * ) Notice: Subject to any disclaimer, the term of this patent is extended or adjusted under 35 U.S.C. 154(b) by 258 days.

(21) Appl. No.: 18/339,437

(22) Filed: Jun. 22, 2023

(65) Prior Publication Data
US 2024/0001758 A1 Jan. 4, 2024

(30) Foreign Application Priority Data

Jun. 29, 2022 (EP) ..................................... 22181836

(51) Int. Cl.
*B60K 11/06* (2006.01)
*B60W 10/08* (2006.01)
(Continued)

(52) U.S. Cl.
CPC ............. *B60K 11/06* (2013.01); *B60W 10/08* (2013.01); *B60W 10/18* (2013.01); *B60W 10/30* (2013.01);
(Continued)

(58) Field of Classification Search
CPC ....... B60K 11/06; B60W 10/08; B60W 10/18; B60W 10/30; B60W 40/06; B60W 2720/10
(Continued)

(56) References Cited

U.S. PATENT DOCUMENTS 6,194,858 B1 * 2/2001 Chen .................. H05K 7/20209
388/903
7,767,354 B2 8/2010 Saito et al.
(Continued)

FOREIGN PATENT DOCUMENTS

| DE | 102014002554 A1 | 8/2015 |
| WO | 2009010817 A1 | 1/2009 |
| WO | 2011114443 A1 | 9/2011 |

OTHER PUBLICATIONS

Extended European Search Report for European Patent Application No. 22181836.2, mailed Jan. 4, 2023, 7 pages.

*Primary Examiner* — Andrew Joseph Rudy
(74) *Attorney, Agent, or Firm* — Withrow & Terranova, PLLC

(57) ABSTRACT

A method of noise management in an electric heavy vehicle, including determining a noise threshold and corresponding reduced target speed for a cooling fan providing cooling of a propulsion/braking system of the vehicle, obtaining look-ahead data pertinent to an upcoming section of a road, and to determine a speed profile for the vehicle such that a cooling requirement of the propulsion/braking system does not exceed a cooling capacity of the cooling fan running at the reduced target speed. The method further includes, while driving along the section of the road, controlling the cooling fan not to exceed the target speed, and controlling the speed of the vehicle in accordance with the speed profile. A corresponding control system, heavy vehicle, computer program and computer program product are also provided.

15 Claims, 3 Drawing Sheets

(51) Int. Cl.
   *B60W 10/18*   (2012.01)
   *B60W 10/30*   (2006.01)
   *B60W 40/06*   (2012.01)

(52) U.S. Cl.
   CPC ......... *B60W 40/06* (2013.01); *B60W 2720/10* (2013.01)

(58) Field of Classification Search
   USPC .......................................................... 701/36
   See application file for complete search history.

(56) References Cited

U.S. PATENT DOCUMENTS

| | | |
|---|---|---|
| 7,947,387 B2 | 5/2011 | Saito et al. |
| 9,533,674 B2* | 1/2017 | Miller .................... B60W 10/08 |
| 9,758,055 B2* | 9/2017 | Izumi .................... B60W 20/13 |
| 10,407,069 B2* | 9/2019 | Okubo ............ B60W 30/18109 |
| 11,104,324 B2* | 8/2021 | Jobson .................. B60W 10/06 |
| 11,442,469 B2* | 9/2022 | Tulpule ................. G05D 1/0293 |
| 2003/0118891 A1 | 6/2003 | Saito et al. |
| 2005/0168180 A1 | 8/2005 | Minekawa et al. |
| 2015/0328992 A1 | 11/2015 | Amaravadi et al. |
| 2016/0185250 A1 | 6/2016 | Izumi |
| 2020/0062126 A1 | 2/2020 | Duan et al. |
| 2020/0070829 A1 | 3/2020 | Martinez et al. |
| 2020/0243924 A1 | 7/2020 | Kinoshita |
| 2021/0237581 A1 | 8/2021 | Rajaie et al. |

* cited by examiner

NOISE MANAGEMENT IN ELECTRIC HEAVY VEHICLES

RELATED APPLICATIONS

The present application claims priority to European Patent Application No. 22181836.2, filed on Jun. 29, 2022, and entitled "NOISE MANAGEMENT IN ELECTRIC HEAVY VEHICLES," which is incorporated herein by reference in its entirety.

TECHNICAL FIELD

The present disclosure relates to the field of electric heavy vehicles. In particular, the present disclosure relates to noise management in electric heavy vehicles, such as in electrified buses, trucks, construction equipment or similar.

BACKGROUND

An electric heavy vehicle often uses its electric propulsion system also for braking of the vehicle, by implementing so-called regenerative braking wherein one or more electric motors of the vehicle are operated as generators in order to complement, and offload a burden of, the vehicle's service brakes. Some of the thereby generated electric energy may be used to charge the batteries of the vehicle, while the remaining energy is converted into exhaust heat in for example a dedicated braking resistor. In addition to such regenerative braking, one or more retarders may also be used to offload the burden of the service brakes.

In a situation where the batteries of the vehicle are already at a high state-of-charge (SOC), more of the electric energy generated through the braking of the vehicle needs to be handled by the braking resistor. The braking resistor, as well as the electric propulsion system of which the braking resistor may be said to form part, therefore needs sufficient cooling to keep temperature levels within rated limits. Such cooling of the electric propulsion system of the vehicle is often handled by providing one or more cooling fans configured to transport excess heat into the ambient environment of the vehicle.

Especially at higher ambient temperatures, such cooling fans often need to operate at higher power, which results in an increase of the audible noise generated by the cooling fans. Without an internal combustion engine (ICE) to at least partially mask the audible noise of the cooling fans, the cooling fan-generated audible noise may become particularly disturbing both inside and outside of electric heavy vehicles.

SUMMARY

To at least partially resolve the above-identified issue with cooling fan noise in electric heavy vehicles, the present disclosure provides a method of noise management in an electric heavy vehicle, as well as a corresponding control system, heavy electric vehicle, computer program and computer program product as defined in the accompanying independent claims. Various embodiments of the envisaged method, control system, vehicle, computer program and computer program product are defined herein.

According to a first aspect of the present disclosure, there is provided a method of noise management in an electric heavy vehicle. The method is performed by/in a control system of the vehicle, and may be e.g., implemented as software (executed) on a processing device (of e.g., a controller of the control system) and/or by using other hardware components (such as one or more analog gates, comparators, integrators, latches, or similar). The method includes determining a noise threshold for a cooling fan configured to provide cooling of an electric propulsion system of the vehicle, the noise threshold being lower than a rated maximum noise of the cooling fan. The method further includes determining, in response to determining the noise threshold, a target speed for the cooling fan at which the noise generated by the cooling fan does not exceed the noise threshold. The method further includes obtaining look-ahead road data pertinent to an upcoming section of a road along which the vehicle is to be driven. The method further includes determining, in response to determining the target speed and based on the look-ahead road data, a speed profile of the vehicle for the section of the road such that, with the vehicle being driven according to the speed profile, a cooling requirement of the electric propulsion system does not exceed a cooling capacity of the cooling fan running at the target speed. The method further includes, while the vehicle is driven along the section of the road, i) controlling the cooling fan not to exceed the target speed, and ii) controlling a speed of the vehicle in accordance with the speed profile.

The present disclosure may improve upon currently available technology in that by using look-ahead road data, the speed of the vehicle can be proactively planned such that a cooling requirement of the electric propulsion system is low enough to guarantee that the speed of the cooling fan may be reduced such that its generated noise stays below a predefined noise threshold. By determining/defining this noise threshold below a level where the noise is considered to e.g., be disturbing to a driver of the vehicle, the noise-related part of the overall ride comfort may be improved. This in contrast to conventional cooling systems, wherein the speed of the cooling fan instead follows whatever the cooling requirement of the electric propulsion happens to be in any situation, without any guarantee that the noise level of the cooling fan will remain within audibly comfortable limits, and wherein the cooling fan is likely to end up being driven at its maximally rated speed in order to meet the unpredictable (as a result of not using look-ahead data) cooling demands/requirements of the propulsion system.

In some embodiments of the method, the method may further include obtaining an indication that the vehicle is to be operated in a dedicated quiet mode, and determining the noise threshold in response to obtaining the indication. A "quiet mode" may also be referred to as a "comfort mode", "low-noise mode", or any similar term indicating that the mode has an intention to improve the audible experience and reduce the audible noise in e.g., a cabin (or even on an outside) of an electric vehicle. As envisaged herein, the indication may be provided for example as a result of the driver of the vehicle pressing a button, toggling a switch, navigating a menu system, or similar, of the vehicle or e.g., on a smartphone/tablet. The indication may instead, or in addition, also be provided as a result of the vehicle entering a particular zone in which tolerable noise levels are regulated, e.g., by law and/or by other national/regional/local requirements or statutes. In particular, the present disclosure envisages that a vehicle may e.g., be operable between at least two modes, wherein one mode is the above-mentioned "quiet mode", and the other mode is some other mode in which the allowed noise of the cooling fan is higher or even unregulated. In other embodiments, the noise threshold may be determined in response to the vehicle entering e.g., an "economy mode" or similar.

In some embodiments of the method, the electric propulsion may be capable of braking the vehicle (e.g., by implementing regenerative braking), and controlling the speed of the vehicle according to the speed profile may include using the electric propulsion system for such braking of the vehicle.

In some embodiments of the method, the method may include estimating noise generated by the cooling fan based on a dependence of generated cooling fan noise on cooling fan speed. How the generated cooling fan noise depends on the cooling fan speed may e.g., be provided by calculations and/or a lookup table. Phrased differently, a function which indicates a dependence of generated cooling fan noise on cooling fan speed may be provided or at least approximated. For example, in some embodiments, a lookup table may be used and include e.g., a plurality of rows each corresponding to a particular noise level and a corresponding cooling fan speed, providing e.g., a noise per rpm (revolutions per minute) relationship.

In some embodiments of the method, the method may further include, while the vehicle is driven along the section of the road, receiving a signal indicative of a measured noise level of the vehicle, and dynamically updating the speed profile of the vehicle based on at least one of the measured noise level and a change of the measured noise level over time. As will be described later herein, this may include e.g., to predict a future noise level based on an actual noise level and e.g., a derivative of the noise level, and to, if the predicted noise level indicates a future situation in which the cooling fan noise exceeds the determined noise threshold, adjust the speed profile in order to proactively avoid such a future situation. As envisaged herein, the noise level may e.g., be measured using one or more microphones or other transducers capable of converting sound/noise into a signal readable by e.g., a controller, control system, and/or processor device of the vehicle configured to perform the noise management.

In some embodiments of the method, the noise threshold may be a noise level within a cabin of the vehicle. Phrased differently, the envisaged method may be used to regulate a noise level within the cabin of the vehicle, i.e., on an inside of the vehicle.

In some embodiments of the method, the measured noise level may be measured within the cabin. This may e.g., be the case if the noise threshold is a noise level in a cabin of the vehicle. If using a microphone or other transducer to measure the noise level, the microphone or other transceiver may e.g., be placed on the inside of the vehicle, e.g., in the cabin.

In some embodiments of the method, the noise threshold may be a noise level on an outside of the vehicle. Phrased differently, the envisaged method may be used to regulate a noise level on the outside of the vehicle. This may be particularly beneficial if e.g., the regulations where the vehicle is driving is such that external noise levels of a vehicle are regulated.

In some embodiments of the method, the measured noise level may be measured on the outside of the vehicle. This may e.g., be the case if the noise threshold is a noise level on the outside of the vehicle. If using a microphone or other transceiver to measure the noise level, this/these may be placed on the outside of the vehicle, e.g., mounted to (and on the outside of) the vehicle.

In some embodiments, multiple microphones/transducers may be used to take measurement of noise levels at different locations of the vehicle (e.g., within the cabin and/or outside the cabin). The noise threshold may then for example be a threshold for an average of the multiple measurements, where the average may e.g., be a standard average or even a weighted average (thus allowing e.g., noise in a cabin to be considered as less desirable than noise outside the cabin, or similar).

According to a second aspect of the present disclosure, there is provided a control system for noise management in a heavy electric vehicle. The control system is configured to: determine a noise threshold for a cooling fan configured to provide cooling of an electric propulsion system of the vehicle, wherein the noise threshold is lower than a rated maximum noise of the cooling fan; determine, in response to determining the noise threshold, a target speed for the cooling fan at which a noise generated by the cooling fan does not exceed the noise threshold; obtain look-ahead road data pertinent to an upcoming section of a road along which the vehicle is to be driven; determine, in response to determining the target speed and based on the look-ahead road data, a speed profile of the vehicle for the section of the road such that, with the vehicle being driven according to the speed profile, a cooling requirement of the electric propulsion system does not exceed a cooling capacity of the cooling fan running at the target speed; and, while the vehicle is driven along the section of the road, i) control the cooling fan not to exceed the target speed, and ii) control a speed of the vehicle in accordance with the speed profile. The control system is thus configured to perform the method of the first aspect.

In some embodiments of the control system, the control system may further be configured to perform any embodiment of the method of the first aspect as envisaged, disclosed and discussed herein.

Herein, when referring to the control system as being configured to perform a method, it may be envisaged that the control system may include a processor device/processing circuitry (as part of e.g., a controller), and that it is the processor device (in response to executing suitable program code) that is configured to cause the control system to perform the method.

According to a third aspect of the present disclosure, there is provided an electric heavy vehicle. The vehicle includes an electric propulsion system, a cooling fan configured to provide cooling of the electric propulsion, and a control system as envisaged herein (e.g., the control system according to the second aspect or any embodiment thereof disclosed and discussed herein).

According to a fourth aspect of the present disclosure, there is provided a computer program for noise management in a heavy electric vehicle. The computer program includes computer code that, when running on a processor device of a control system (such as the control system according to the second aspect, or any embodiment thereof disclosed and discussed herein) of the vehicle, causes the control system to: determine a noise threshold for a cooling fan configured to provide cooling of an electric propulsion system of the vehicle, wherein the noise threshold is lower than a rated maximum noise of the cooling fan; determine, in response to determining the noise threshold, a target speed for the cooling fan at which a noise generated by the cooling fan does not exceed the noise threshold; obtain look-ahead road data pertinent to an upcoming section of a road along which the vehicle is to be driven; determine, in response to determining the target speed and based on the look-ahead road data, a speed profile of the vehicle for the section of the road such that, with the vehicle being driven according to the speed profile, a cooling requirement of the electric propulsion system does not exceed a cooling capacity of the cooling fan running at the target speed; and, while the vehicle is driven along the section of the road, i) control the cooling fan not to exceed the target speed, and ii) control a speed of the vehicle in accordance with the speed profile. The computer code is thus such that it, when running on the processor device of the control system, causes the control system to perform the method of the first aspect.

In some embodiments of the computer program, the computer code may be further such that it, when running on the processor device of the control system, causes the control system to perform any embodiment of the method of the first aspect as disclosed and discussed herein.

As envisaged herein, the processing device may e.g., form part of a controller of the control system, such that the processing device, when executing the computer code, causes the controller to perform at least parts of the method performed by the overall control system. For example, the interpretation of a signal from e.g., a measuring device/sensor may be performed by the controller, why the actual generation of such a signal may be performed by the measuring device/sensor, which may or may not form part of the control system.

According to a fifth aspect of the present disclosure, there is provided a computer program product. The computer program product includes a computer-readable storage medium on which a computer program (such as the computer program of the ninth aspect, or any embodiment thereof disclosed herein) is stored.

In some embodiments of the computer program product, the computer-readable storage medium may be non-transitory.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units/controllers and computer-readable (storage-)media, associated with the above discussed technical effects and corresponding advantages.

BRIEF DESCRIPTION OF THE DRAWINGS

With reference to the appended drawings, below follows a more detailed description of aspects of the disclosure cited as examples. In the drawings, FIG. 1 schematically illustrates embodiments of a heavy vehicle according to the present disclosure.

Figure 1:
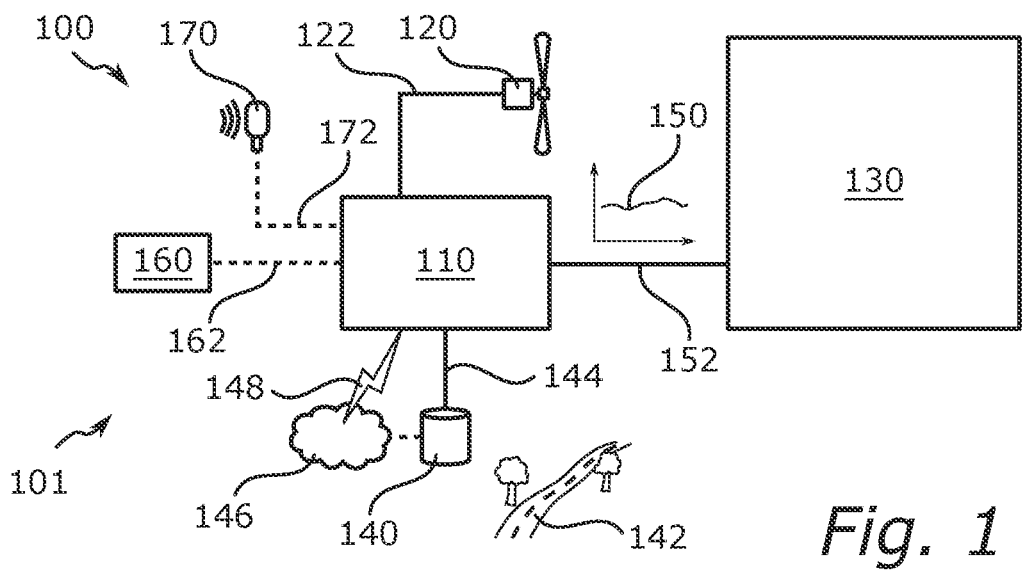

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments. In Figures illustrating a method, the steps performed are not necessarily to be performed in the illustrated order, but may be changed as desired as long as e.g., a first step producing an output used by a second step is always performed before the second step. Likewise, if the output of the first step is not used to perform the second step, the order of the first and second steps may just as well be interchanged, if desired.

DETAILED DESCRIPTION

Aspects set forth below represent the necessary information to enable those skilled in the art to practice the disclosure.

The envisaged solution of how to improve noise management in a heavy vehicle will now be described in more detail with reference to FIGS. 1, 2A, 2B, 3A, 3B and 4.

In what follows, the terms "heavy vehicle" and "vehicle" will be used interchangeably. The same applies to e.g., the terms "electric propulsion system 130" and "propulsion system"; and to the terms "electric machine", "electric motor" or just "motor", which will be used interchangeably as well.

FIG. 1 schematically illustrates various parts of a vehicle 100 relevant for the description of the envisaged solution. The vehicle 100 may of course include other parts as well, but which are not shown in any Figure in order to avoid cluttering.

The vehicle 100 includes a controller 110 as part of a control system 101, an electric propulsion system 130, and a cooling fan 120 configured to provide cooling of the propulsion system 130. The propulsion system 130 may for example include one or more electric machines (e.g., electric motors) and one or more wheels driven by the one or more motors. A motor may be configured to directly drive a particular wheel, or a transmission may be provided in between a motor and a wheel in order to e.g., allow the motor to operate at a different (often higher) rpm than that of the wheel. A motor may be provided for each wheel, or two or more wheels may e.g., be driven by a same motor in order to e.g., reduce a complexity of the overall propulsion system 130. The one or more motors are driven by electric energy, which may be supplied e.g., from a battery or battery pack, and/or from e.g., a hydrogen power supply or similar, or from any type of power supply system suitable to power the one or more (electric) motors of the propulsion system 130. Such a power supply system may e.g., include a battery or battery pack, a supercapacitor, a hydrogen storage (plus necessary means for converting the hydrogen into electric energy, as used in e.g., fuel cell vehicles), or similar. The one or more motors may operate using DC or AC power. If the power supply system provides DC power and the motors requires AC power to operate, the propulsion system 130 may include one or more AC inverters, such that a DC power from e.g., a battery or battery pack may be converted into AC power before being delivered to the one or more motors. In some embodiments, the propulsion system 130 may also be capable of regeneratively braking the vehicle 100, i.e., by operating the one or more motors as generators such that they may apply braking torque to the one or more wheels while producing electric energy. In some situations, the energy thus generated (when braking the vehicle 100) may be used to e.g., charge the battery or battery pack of the propulsion system 130. If the battery or battery pack is already full, or if charging of the battery or battery pack is alone not sufficient to handle all of the generated energy, the energy may instead, or in addition, be released into the environment by using e.g., one or more dedicated braking resistors or similar.

In general, the exact shape, form, configuration, etc., of the propulsion system 130 is not that important, as long as the propulsion system 130 is such that it uses electric energy to propel and/or braking the vehicle 100, and in particular such that while so doing, excess heat is at least sometimes generated.

For the purpose of handling such excess heat, the vehicle 100 includes the cooling fan 120, which is configured to transport heat generated by the propulsion system 130 into the ambient environment. The cooling fan 120 may e.g., be arranged to cool the propulsion system 130 as a whole, or e.g., be configured to cool only part of the propulsion system 130. For example, the cooling fan 120 may be configured to cool a battery or battery pack of the propulsion system 130, the one or more motors of the propulsion system 130, a braking resistor (if used) of the propulsion system 130, or similar. There may of course also be more than one cooling fan, and the single cooling fan 120 will be used to illustrate the envisaged solution for any configuration of cooling fans. The capability of the cooling fan 120 to transport heat may be assumed to depend on a rotational speed of the cooling fan 120, and such rotational speed of the cooling fan 120 is in turn assumed to be dependent on an electric power supplied to the cooling fan 120. The control system 101 may in some embodiments be configured to control the rotational speed of the cooling fan 120 by changing an amount of electric power supplied to the cooling fan 120 (via e.g., a power line 122 connecting the controller 110 and the cooling fan 120). In other embodiments, the cooling fan 120 may be powered from somewhere else, but the controller 110 may then still control the speed of the cooling fan 120 by e.g., sending a control signal 122 for a controller included as part of the cooling fan 120 itself, or similar.

The control system 101 is also configured such that it may instruct the propulsion system 130 to drive the vehicle 100 at a certain speed, or in accordance with a particular speed profile 150. The speed profile 150 may e.g., include how a desired speed of the vehicle 100 is to change with time/distance, or e.g., indicate a desire to drive the vehicle 100 at constant speed. Controlling of the speed of the vehicle 100 may e.g., be obtained by the control system 101 and the controller 110 sending a suitable control signal 152 to the propulsion system 130. Just as for the propulsion system 130 itself, exactly how the propulsion system 130 is controlled is not that important, as long as the control system 101 and the controller 110 has at least some means of providing instructions to the propulsion system 130, and such that the propulsion system 130 is configured to act in accordance with the instructions (e.g., as provided by the signal 152) from the control system 101 and the controller 110.

The control system 101 further has access to look-ahead road data 140, which provides an indication of e.g., topology and/or other road data of a particular section of a road 142 (along which the vehicle 100 is to be driven). For example, the road data 142 may include information about how the elevation of the road surface changes as a function of distance/position, information about a steepness/slope of the road as a function of distance/position, or similar. The road data 140 may e.g., also include information about how the section of the road 142 turns (e.g., information about where corners of the section of the road 142 are and e.g., how sharp they are). The road data 140 may e.g., be stored in a database. If the road data 140 is stored within the vehicle 100, the road data 140 may e.g., be accessed using a direct connection 144 between the road data (storage) and the controller 110. In other embodiments, the road data 140 may instead be available from a cloud/on the Internet 146, and the vehicle 100 may then use e.g., one or more wireless connections 148 to obtain the road data 140 from the cloud/Internet storage 146. Also here, exactly how the road data 140 is obtained is not that important, as long as the control system 101 and controller 110, by any means, has access to the data 140 relevant for the upcoming section of the road 142.

As will be discussed in more detail further below, the control system 101 may also, in some embodiments, be communicatively connected with (or e.g., include) a mode indicator 160 and/or one or more sound/audio transducers (such as one or more microphones) 170.

FIG. 1 also serves to illustrate various examples of the envisaged control system 101 for the vehicle 100, including e.g., the controller 110 and optionally one or more of the road data storage 140, the mode indicator 160 and the one or more sound transducers 170 (and the associated signal connections 122, 144, 152, 162 and/or 172 as required).

How the control system 101 and controller 110 are envisaged to operate to manage the noise of the vehicle 100, and in particular the noise generated by the cooling fan 120, when driving the vehicle 100 will now be described in more detail with reference also to FIGS. 2A and 2B.

Figure 2A:
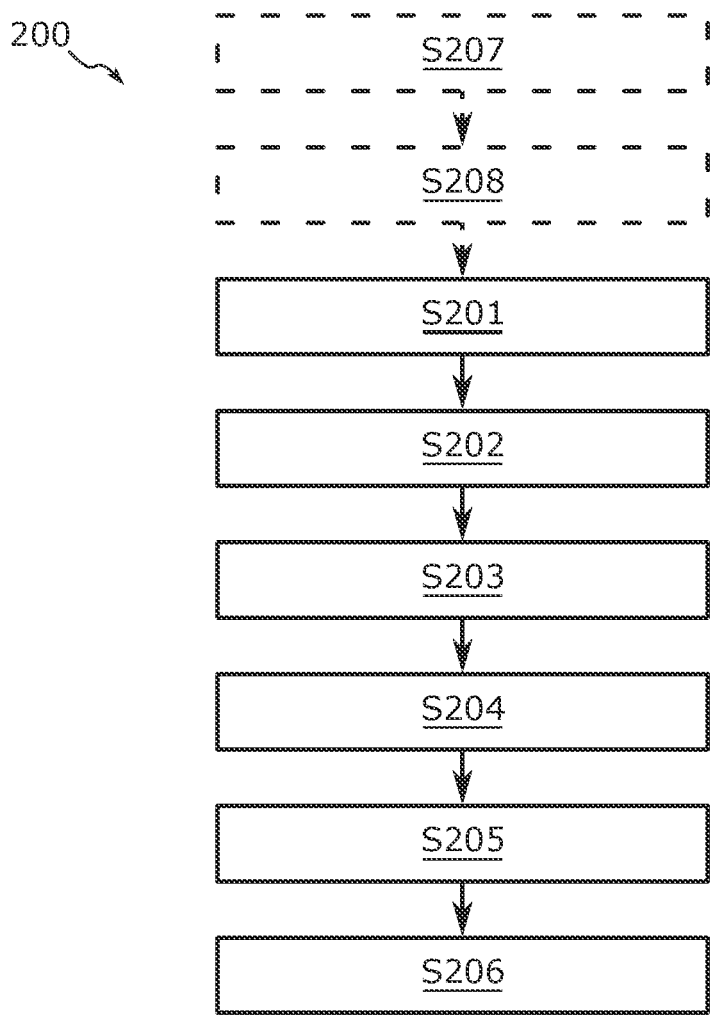
FIG. 2A schematically illustrates a flowchart of embodiments of a method according to the present disclosure.
Figure 2B:
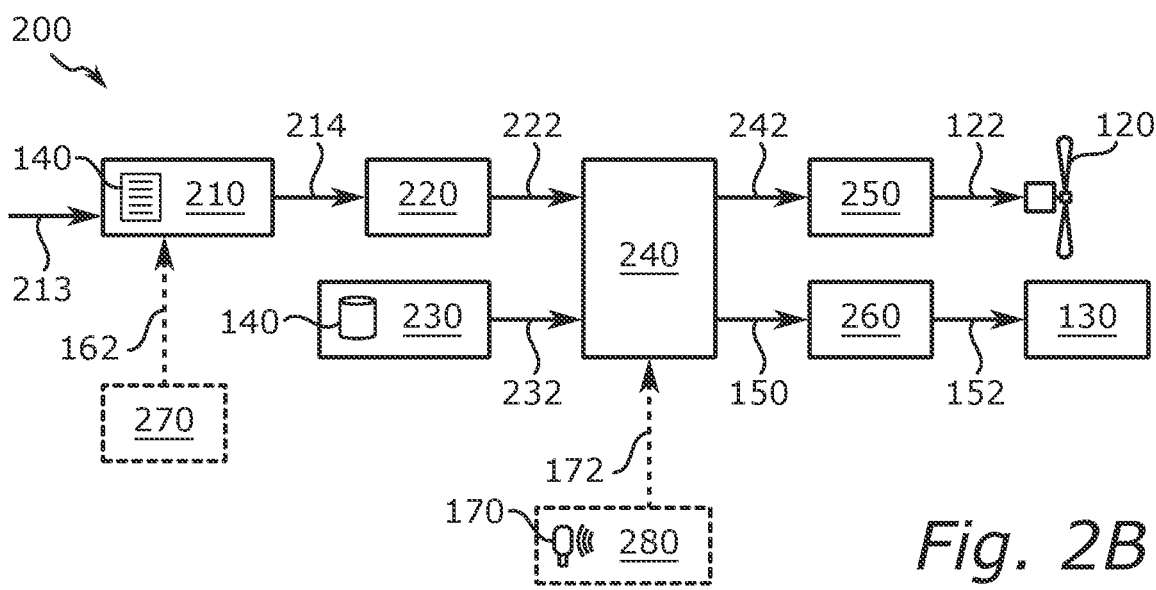
FIG. 2B schematically illustrates, in terms of a number of functional blocks, embodiments of a method, as well as embodiments of a controller/a control system, according to the present disclosure.

FIG. 2A schematically illustrates a flowchart of various embodiments of a method 200 of noise management in the vehicle 100, as performed by the control system 101. Similarly, FIG. 2B also illustrates the method 200, but in terms of a number of functional blocks. FIG. 2B also serves to illustrate embodiments of a control system (such as the control system 101) and a controller (such as the controller 110) as envisaged herein. The method 200 may e.g., be performed using a processor device of the controller 110, as will be described in more detail later herein with reference to e.g., FIG. 4.

A first determination module 210 has access to noise information 212 about the cooling fan 120, including e.g., a rated maximum noise $L_{max}$ of the cooling fan 120. The rated maximum noise may e.g., correspond to a noise generated by the cooling fan 120 if the cooling fan 120 is operated at its rated maximum speed. The first determination module 210 may also be configured to receive a signal 213 indicative of a desired maximum noise level of the cooling fan 120. The signal 213 may e.g., be provided in response to an action performed by a driver of the vehicle 100, such as e.g., the driver selecting a desired maximum noise level of the cooling fan 120 from e.g., a menu of a user interface within a cabin of the vehicle 100, from a menu of a smartphone/tablet application, or similar. In general, the first determination module 210 is configured to, based on e.g., the noise information 212 and/or the signal 213, determine a noise threshold $L_{threshold}$ for the cooling fan 120, wherein the noise threshold $L_{threshold}$ is such that it is at least below the rated maximum noise of the cooling fan 120. In some embodiments, the first determination module 210 may e.g., be configured such that it has access (e.g., internally or from an external source) to at least one predefined such noise threshold.

The noise threshold is sent as a signal 214 which is received by a second determination module 220. The second determination module 220 is so configured that it, in response to receiving the noise threshold $L_{threshold}$ (that is, in response to the first determination module 210 determining the noise threshold $L_{threshold}$), determines a target speed $\omega_{target}$ for the cooling fan 120 at which a noise $L_{fan}$ ($\omega=\omega_{target}$) generated by the cooling fan does not exceed the noise threshold $L_{threshold}$, i.e. such that $L_{fan}(\omega_{target}) \leq L_{threshold}$. Determining what fan speed that corresponds to a particular noise level may e.g., be performed based on tabulated values, and/or e.g., based on one or more equations which at least approximately relates fan speed and fan noise. Such tabulated values and/or functions may for example be provided by a manufacturer of the cooling fan and/or vehicle, from experiments, from numerical simulations, or similar.

A road data module 230 is provided and configured to provide road data 140 about an upcoming section of a road. The road data module 230 may for example store (or in some other way have access to) topographical data from which e.g., road curvature, road slope/grading, elevation, road surface, or similar is obtained and compiled into road data 140 pertinent for the particular section of the road which the vehicle 100 is to be driven along. The road data module 230 may, in some embodiments, also include (or have access to) other data such as weather data, traffic (jam/density) data, or similar, and such data may of course then also be included in the road data 140 output from the road data module 230. In general, the road data 140 is such that it is relevant for a planned, upcoming section of a road, such that it may be used to look-ahead while planning how to control a future speed of the vehicle 100.

A third determination module 240 is provided and configured to receive both the target speed $\omega_{target}$ of the cooling fan 120 (which is provided to the third determination module 240 as a signal 222 sent from the second determination module 220) and the road data 140 (which is provided to the third determination module 240 as a signal 232 sent from the road data module 230). The third determination module 240 is further configured to, in response to receiving the target speed $\omega_{target}$ (that is, in response to the second determination module 220 determining the target speed $\omega_{target}$) and based on the road data 140 received from the road data module 230 (e.g. as part of a signal 232), determine a speed profile 150 ($v_{profile}$) for the vehicle 100. The speed profile 150 may e.g., be expressed as speed as a function of distance (e.g., $v_{profile}(x)$, where x is a distance along the particular section of the road), or similar. The speed profile 150 is determined by the third determination module 240 such that, with the vehicle being driven according to the speed profile 150, a cooling requirement of the electric propulsion system does not exceed a cooling capacity of the cooling fan 120 running at the target speed $\omega_{target}$.

Determining the speed profile $v_{profile}$ may e.g. be seen as an optimization problem, wherein it may be desirable to find a speed profile $v_{profile}$ which e.g. allows the vehicle 100 to finish the particular section of the road as quickly as possible (within legal speed-limits), but while also making sure that the cooling capacity of the cooling fan 120 (when run such that its speed does not exceed the target speed $\omega_{target}$) is sufficient to meet a cooling demand of the propulsion system 130 of the vehicle 100. Legal speed-limits may e.g., be provided as a function $v_{legal}(x)$ indicating a maximum legally allowed speed at distance x along the particular section of the road, and the cooling requirement of the propulsion system 130 may be calculated based on the road data 140 and provided as a function $P_{demand}(x)$. The task of the third determination module 240 is then to find a speed profile $v_{profile}$ which minimizes the time required to complete the particular section of the road, subject to the requirements that a) at any point/distance x along the particular section of the road, the speed profile meets the legal speed limits (i.e. $v_{profile}(x) \leq v_{legal}(x)$), and b) the cooling demand of the propulsion system 130 does not exceed the cooling capability of the cooling fan (i.e. $P_{demand}(x) \leq P_{fan}(\omega_{target})$, where $P_{fan}(\omega)$ is the cooling capability/power of the cooling fan 120 when operated at speed $\omega$. As envisaged herein, it may of course be allowed for the third determination module 240 to calculate $v_{profile}$ such that one or both of the above-mentioned constraints are temporarily violated.

The look-ahead road data 140 may e.g., be used to take into account whether there are upcoming downhill and/or uphill sections, in which e.g., the motors of the vehicle 100 are to be used to brake or to propel the vehicle 100. The third determination module 240 may also take into account e.g., a current state-of-charge (SOC) of e.g., a battery or battery pack of the vehicle 100 and the propulsion system 130, and/or make predictions about future SOC along the particular section of the road which is to be driven. For example, if the SOC is estimated or known to be high before entering a downhill section, the propulsion system 130 will not be able to further charge the battery or battery pack in order to brake the vehicle 100 going downhill. Instead, the power generated by the braking may instead be burned using a braking resistor (or similar), and the additional cooling requirements needed because of this can be taken into account. If the estimated cooling requirements if going downhill exceeds the capability of the cooling fan 120 operating at or below the desired noise threshold, the speed of the vehicle 100 may be reduced before arriving at the downhill section, in order to reduce the heat dissipated through the braking resistor and to thereby lower the cooling requirements of the propulsion system 130. In other situations, it may not be the SOC but instead the maximum charging rate of the battery or battery pack that are limiting in a downhill section. If this is the case, the third determination module 240 may decide to reduce the speed throughout the downhill section, such that the battery or battery pack of the vehicle 100 may charge slower and during a longer time, thus reducing the cooling demand of the propulsion system 130 while also optimizing the total charge added to the battery or battery pack during the downhill section. In yet other situations, the third determination module 240 may reduce a speed going up an uphill section, in order to reduce the cooling demand of the motors of the propulsion system 130 in order to keep the cooling demand of the propulsion system 130 at or below the capacity of the cooling fan 120 operating at (or below) the target speed. Many other such scenarios are of course also possible, and the third determination module 130 may generate the speed profile for the vehicle 100 such that it takes the various scenarios into account in order to match the cooling demand of the propulsion system 130 and vehicle 100 to the (reduced) capability of the cooling fan 120 at or below the target speed.

A fan speed control module 250 is provided and configured to receive the target speed $\omega_{target}$ for the cooling fan (as a signal 242 sent from the third determination module 240), and is further configured to, while the vehicle is driven along the particular section of the road, control the cooling fan 120 not to exceed the target speed $\omega_{target}$, e.g. by sending the control signal 122 to the cooling fan 120. As envisaged herein, if the situation so allows the cooling fan 120 may e.g., be operated such that its speed is below the target speed $\omega_{target}$, i.e., it is not always required that the speed of the cooling fan 120 is always as high as the target speed $\omega_{target}$.

As envisaged herein, the control signal 122 may e.g., be a PWM-signal provided to a drive circuit (not shown) of the cooling fan 120, or similar. As already mentioned herein, the signal 122 may in other embodiments be a power signal to the control fan 120, such that no further controller is required within the cooling fan 120 itself. If the latter, it may be assumed that the control system 101 (as part of e.g., the controller 110 or as part of some other component of the control system 101) includes the necessary circuitry for providing such a power signal, such as e.g., a drive circuit for the cooling fan 120 or similar.

A vehicle speed control module 260 is also provided and configured to receive the speed profile $v_{profile}$ (as a signal 244 sent from the third determination module 240). The vehicle speed control module 260 is further configured to, while the vehicle 100 is driven along the particular section of the road, control a speed of the vehicle 100 in accordance with the speed profile 150 ($v_{profile}$), by for example sending the control signal 152 to the propulsion system 130. Preferably, the control signal 152 is only a data signal to one or more drivers for the one or more motors of the propulsion system 130. In other embodiments, it may of course also be envisaged that the signal 152 is instead a power signal (i.e., a sufficient current and/or voltage) for driving one or more of the motors of the propulsion system 130, such that no further drivers for the affected one or more motors are needed, and that the control system 101 may in such a situation include the necessary drive circuits for the one or more motors required to generate such sufficient current and/or voltage, as part of e.g. the controller 110 or as one or more separate components. As envisaged herein, the signal 152 may also provide control data/signals for one or more brakes of the vehicle 100, such as e.g., signals to activate/deactivate service brakes of the vehicle, or similar, or e.g., signals to operate the one or more motors as generators in order to (at least partially) brake the vehicle 100. The exact configuration of various signals, drivers, and similar used to control the propulsion system 130 using the control system 101 is not that important, as long as the control system 101 has at least one means of either directly, or via one or more intermediate circuits and/or other controllers, control the speed of the vehicle 100 in accordance with the speed profile 150 ($v_{profile}$).

Referencing back to FIG. 1, in some embodiments of the vehicle 100, the vehicle 100 may also include the mode indicator 160. The mode indicator 160 may be configured to allow e.g., a user/driver of the vehicle 100 to toggle between at least two modes, wherein one mode is a "quiet mode" in which the method 200 is to be performed in response to receiving an indication (e.g., a signal 162) indicating that the user/driver wants to enter the quiet mode. For this purpose, the mode indicator 160 may for example provide a toggle switch with which the driver can change between the at least two modes, or any other type of selector providing a same functionality. The mode indicator 160 may, in some embodiments, instead provide e.g., a user interface integrated into the dashboard or similar of the vehicle 100, and provide a menu structure from which the driver may select the desired mode. The other mode, which is not a quiet mode, may be used to indicate that the driver does not want to perform the method 200, and the control of the speed of the cooling fan 120 may then be performed without taking any noise limitations into account.

In some embodiments, the mode indicator 160 may form part of an automated system, wherein the quiet mode is entered e.g., based on a geographical location of the vehicle 100 (as obtained using GPS coordinates or similar). For example, if an area has local restrictions on how much noise a vehicle may produce, the mode indicator 160 may be configured to automatically enter into the quiet mode (by providing the corresponding signal 162 to the control system 101 and controller 110) once the vehicle 100 enters the area.

Obtaining the indication 162 to enter the quiet mode may be performed as an optional step S207 of the method 200, as indicated by the corresponding dashed box in FIG. 2A. Using functional blocks as in FIG. 2B, this may correspond e.g., to providing an optional mode indication/selection module 270 which may provide the signal 162 to for example the first determination module 210. If the signal 162 indicates that the vehicle 100 should be operated in the quiet mode, the first determination module 210 may proceed with determining the noise threshold to be less than a rated maximum noise of the cooling fan 120 ($L_{threshold} < L_{max}$) as described above. If the signal 162 indicates that the vehicle 100 should not be operated in the quiet mode (and instead in some other mode), the first determination module 210 may then respond by instead determining the noise threshold to e.g., at least equal the rated maximum noise of the cooling fan 120 (e.g., $L_{threshold} \geq L_{max}$).

In some embodiments of the vehicle 100, the vehicle 100 may include an optional sound transducer 170, e.g., in form of a microphone. The microphone 170 may be configured to measure a noise level $L_{measure}$ of the vehicle 100 in for example the cabin of the vehicle 100, and/or on an outside of the cabin, and provide an indication of the measured noise level as a signal 172 to the control system 101 and controller 110. If using the microphone 170, the method 200 may include, in an optional step S208, receiving the signal 172, and dynamically updating the speed profile 150 based on the measured noise level $L_{measure}$, and/or on a changing of the measured noise level $L_{measure}$ over time (e.g. based on $dL_{measure}/dt$, or on $\Delta L_{measure}/\Delta t$). For example, by monitoring how the measured noise level changes over time, the control system 101 may predict whether the current speed profile 150 was correctly generated (based on the look-ahead road data 140), or if it appears as if the noise level of the vehicle 100 is going to, if continuing to be driven according to the current speed profile 150, exceed the desired noise threshold $L_{threshold}$. If the latter, the control system 101 (using e.g., the controller 110) may then update the speed profile 150 in order to avoid the noise level of the vehicle 100 exceeding the desired noise threshold $L_{threshold}$. Using functional blocks as in FIG. 2B, an optional noise level module 280 having access to the microphone 170 measurements may be provided and configured to provide the measured noise level(s) to e.g., the controller 110 of the control system 101, e.g., as the signal 172 sent to the third determination module 240. In other embodiments, the noise measurements may be received by the controller 110 from e.g., a smartphone/tablet or similar.

In some embodiments, the one or more audio transducers (such as microphone(s) 170) may be used to correlate how measured noise levels depend on fan speed. For example, a microphone 170 may perform measurements of a noise within (or outside) the cabin at different speeds of the cooling fan 120, to update a mapping between noise and fan speed. Such an updated mapping may then be used e.g., when determining the target speed $\omega_{target}$ for the cooling fan 120 at which the noise generated by the cooling fan 120 does not exceed the noise threshold $L_{threshold}$. This may be advantageous in that e.g., a better mapping between noise and fan speed may be created than a mapping provided e.g., from the manufacturer of the cooling fan 120, and which better takes into account how the cooling fan 120 interacts with other components of the vehicle.

Figure 3A:
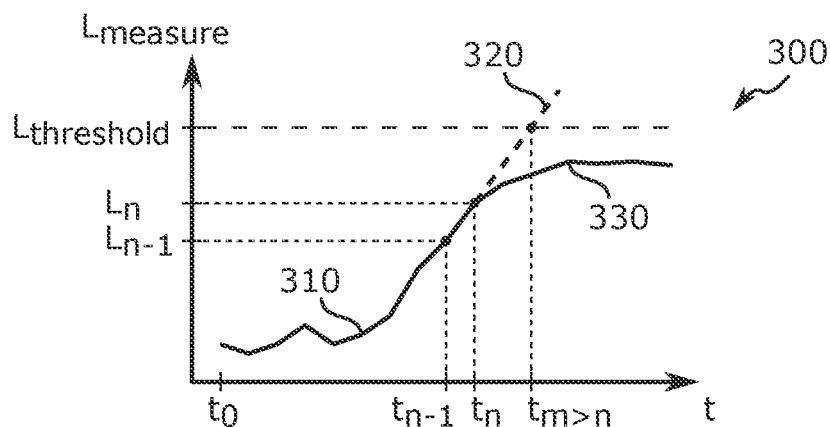
FIG. 3A schematically illustrates embodiments of a method according to the present disclosure, in which future noise levels are forecasted based on input from a microphone.
Figure 3B:
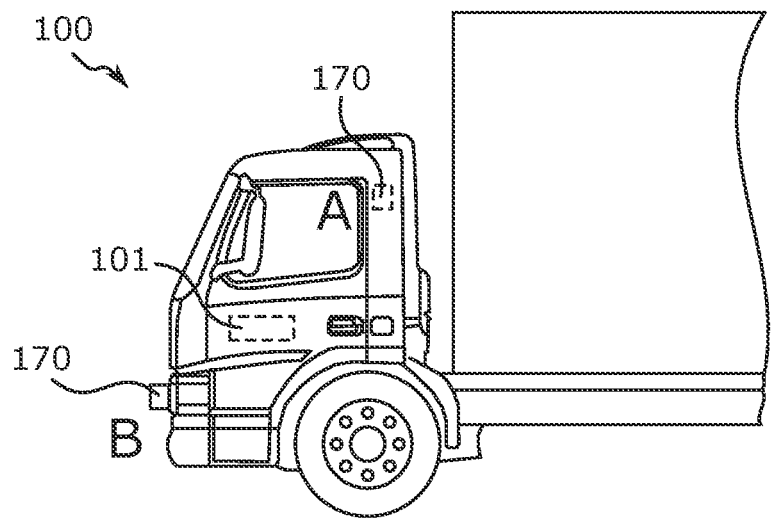
FIG. 3B schematically illustrates examples of possible placements of one or more microphones in a vehicle as envisaged herein.

Further details about such forecasting based on input from the microphone 170 will now be provided with reference to FIGS. 3A and 3B.

FIG. 3A schematically illustrates a plot 300 of measured noise level $L_{measure}$ (vertical axis) as a function of time t (horizontal axis). Between times $t_0$ and $t_n$, the vehicle 100 is being driven according to a current speed profile $v_{current}(x)$, while the noise level $L_{measure}$ of the vehicle 100 is being monitored. For example, it can be assumed that samples $L_i$ of the noise level of the vehicle 100 are provided every time $t_i=t_0+i\Delta t$, where $1/\Delta t$ is the sampling frequency (measured in Hz) and i is an integer. The result of such sampling is illustrated by the curve 310. At time $t_n$, a prognosis is made of how the noise level of the vehicle 100 is likely to evolve if the vehicle 100 is continued to be driven according to the current speed profile $v_{current}(x)$. This prognosis is shown as the dashed curve 320. As can be seen, at a future time $t_m > t_n$, the noise level $L_{measure}$ is likely to exceed the desired noise threshold $L_{threshold}$. The prognosis may for example be made by studying the slope (or gradient/derivative) of the curve 310. For example, by knowing the samples of the noise level at times $t_n$ and $t_{n-1}$, the slope may be calculated as $k_n=(L_n-L_{n-1})/\Delta t$. If assuming that the calculated slope $k_n$ at time $t_n$ will be constant for at least a couple of future times $t_{j>n}$, the prognosis illustrated by the curve 320 can be obtained. Other examples of how to forecast future noise levels may be based on whether the slope of the curve 310 increases with time. For example, the controller 110 may calculate the slopes $k_n$ and $k_{n-1}$, and check whether $k_n$ is greater than $k_{n-1}$. If affirmative, this may further strengthen the belief that the noise level $L_{measure}$ is (soon) to exceed the noise threshold $L_{threshold}$.

Once the controller 110 notices that, if continuing driving the vehicle 100 according to the current speed profile $v_{current}(x)$, the noise threshold $L_{threshold}$ is likely to be exceeded, the controller 110 may take action and update the speed profile to a new speed profile $v_{new}(x)$ such that exceeding the noise threshold $L_{threshold}$ can be avoided. To generate the new speed profile $v_{new}(x)$, the controller 110 may for example once again base its decision on the look-ahead road data 140, but decide upon an overall reduced speed of the vehicle 100 in order to reduce the risk of increasing the cooling demand of the propulsion system 130 to levels above the cooling capacity of the cooling fan 120 operating at or below the noise threshold $L_{threshold}$ (i.e. at or below the target speed $\omega_{target}$). The result of applying this new speed profile $v_{new}(x)$ (as illustrated e.g., by the curve 330) when controlling the speed of the vehicle 100, the envisaged solution may thus in a proactive way take action before the desired noise threshold $L_{threshold}$ is exceeded, and thereby avoid such exceeding from occurring. This may thus provide an improvement over e.g. measuring $L_{measure}$ and take action only when $L_{measure}$ exceeds $L_{threshold}$, as it will then be too late to avoid exceeding the threshold $L_{threshold}$.

FIG. 3B schematically illustrates various envisaged placements of the sound transducer/microphone 170. In one example, the microphone 170 is positioned within the cabin of the vehicle 100, as illustrated by position "A". Positioning the microphone 170 may allow the microphone 170 to measure a sound/noise closer to the one experienced by the driver of the vehicle 100. In another example, the microphone 170 is instead positioned outside the cabin of the vehicle 100, for example mounted to a front of the vehicle 100 as illustrated by position "B". Positioning the microphone 170 outside the cabin may allow the microphone 170 to measure a sound/noise closer to the one experienced by people outside of the vehicle 100, such as e.g., pedestrians, residents along the section of the road along which the vehicle 100 is driven, or similar. This may be particularly useful if there, as described earlier herein, are one or more regulations about noise levels in an area wherein the vehicle 100 is driving (or is to be driven). It is of course also envisaged that there may be more than a single microphone 170 provided at a same time, and arranged to provide multiple signals 172 to the controller 110 indicative of measurements of a noise level of the vehicle 100 performed at different locations.

In some embodiments, when to start the envisaged method by determining the noise threshold for the cooling fan 120 may e.g., be connected to both location and time. For example, local regulations may stipulate that vehicles are only allowed to exceed a certain noise level during evenings and/or nighttime, but have less or no restrictions during daytime. By knowing (based on position) whether the vehicle is within such an area, and by also known (by using e.g., a clock) a time of day, a decision may be made about whether to reduce the noise of the vehicle as envisaged herein or not in accordance with such local regulations, if present.

If a microphone 170 is provided inside the cabin of the vehicle 100, the noise threshold $L_{threshold}$ may be defined as a threshold which the noise is not supposed to exceed within the cabin, e.g., as measured by the microphone 170 in position "A". If the microphone 170 is provided outside the cabin of the vehicle 100, the noise threshold $L_{threshold}$ may then be defined as a threshold which the noise is not supposed to exceed outside of the vehicle, e.g., as measured by the microphone 170 in position "B". If for example both microphones 170 in both positions "A" and "B" are provided, the noise threshold $L_{threshold}$ may e.g., be a noise threshold which an average noise of measurements taken at both positions "A" and "B" is not to exceed, or similar. For example, if $L_{measure}^A$ and $L_{measure}^B$ are the measured noise levels of the vehicle 100 at positions "A" and "B", respectively, an average $L_{measure}^{avg}=(L_{measure}^A+L_{measure}^B)/2$ may be calculated and compared against $L_{threshold}$. More generally, if having N microphones 170 arranged at N different locations (within and/or outside the cabin) of the vehicle 100, an average $L_{measure}^{avg}=\Sigma_{i=1}^N w_i L_{measure}^i$ may be calculated and compared against the noise threshold $L_{threshold}$, where $w_i$ is a weighting factor which is not necessarily equal for all i, such that e.g. noise in one position (e.g. within the cabin) may be weighted higher than noise in another position (such as e.g. outside the cabin), or similar.

The present disclosure also envisages to provide a heavy vehicle, such as for example the vehicle 100. The heavy vehicle includes an electric propulsion system (such as the system 130), a cooling fan configured to provide cooling of the electric propulsion system (such as the cooling fan 120), and a control system 101 for controlling the cooling fan 120. FIGS. 1 and 3B serve to illustrate such a heavy vehicle 100.

The present disclosure also envisages to provide a computer program (not shown) for a control system as envisaged herein. The computer program includes computer code that, when running on a processor device of the control system (e.g., as part of a controller of the control system), causes the control system to perform the various steps of any method (such as e.g., method 200) as described and envisaged herein.

The present disclosure also envisages a computer program product in which the above envisaged computer program is stored or distributed on a data carrier. For example, the computer program may be the computer program for the controller described above. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable. The data carrier may e.g., be the computer-readable storage medium described below with reference to FIG. 4.

As envisaged herein, the control system 101 may e.g., be at least partly implemented in/by a computer system, as will now be described in more details with reference also to FIG. 4. In particular, the functionality of the controller 110 of the control system 101 may be implemented by such a computer system.

Figure 4:
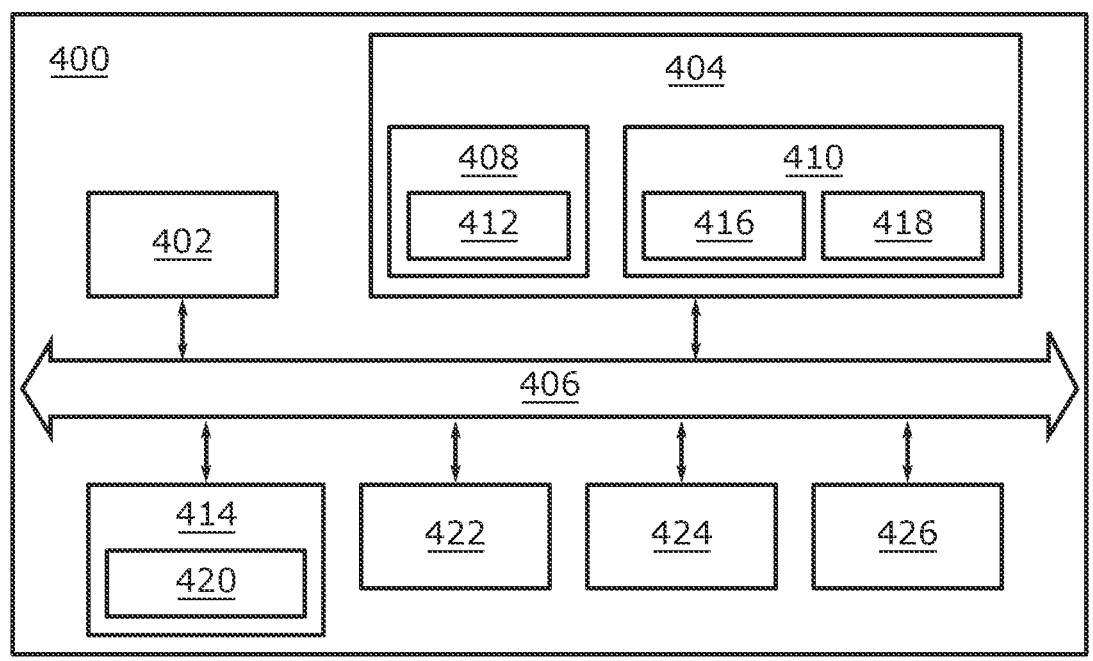
FIG. 4 is a schematic diagram of an exemplary computer system for implementing examples disclosed herein, according to one example.

FIG. 4 is a schematic diagram of a computer system 400 for implementing examples disclosed herein, e.g., for implementing the controller 110 of the control system 101 for the cooling fan 120. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, controller, control system, control unit, processor device, etc., includes reference to one or more such devices to individually or jointly execute a set (or multiple sets) of instructions to perform any one or more of the methodologies discussed herein. For example, the controller of the control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 includes a processor device 402, a memory 404, and a system bus 406. The system bus 406 provides an interface for system components including, but not limited to, the memory 404 and the processor device 402. The processor device 402 may include any number of hardware components for conducting data or signal processing or for executing computer code stored in memory 404. The processor device 402 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processor device 402 (e.g., via a circuit or any other wired, wireless, or network connection) and may include computer code for executing one or more processes/methods described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a processor device 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 (such as the computer program product mentioned earlier herein) stored on a transitory or non-transitory computer-usable or computer-readable storage medium (e.g., single medium or multiple media), such as the storage device 414, which includes complex programming instructions (e.g., complex computer-readable program code) to cause the processor device 402 to carry out the steps described herein. Thus, the computer-readable program code can comprise software instructions for implementing the functionality of the examples described herein when executed by the processor device 402, e.g., in order for the computer system 400 to implement the various functionality and method(s) described herein.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

One or both of the input device interface 422 and the output device interface 424 may be configured to allow the computer system 400 to communicate with e.g. the cooling fan 120, the propulsion system 130, the storage of the look-ahead road data 140 (e.g. a database or a cloud storage 146), and (optionally) one or both of the mode selector 160 and the one or more microphones 170, including receiving/sending the signals 122, 144/148, 152, and optionally one or both of the signals 162 and 172. The interfaces 422 and 424 may also be used to receive other information about the vehicle 100. The interface 422 and 424 may e.g., include one or more transmitters and receivers, including analogue and/or digital components, and may utilize e.g., one or more wired and/or wireless connections for this purpose.

The program modules 418 may, for example, include e.g. a first determination module configured to perform step S201 of the method 200 described with reference to FIG. 2A or 2B (e.g. corresponding to the module 210), a second determination module configured to perform step S202 (e.g. corresponding to the module 220), a road data module configured to perform step S203 (e.g. corresponding to the module 230), a third determination module configured to perform step S204 (e.g. corresponding to the module 240), a vehicle speed control module configured to perform step S205 (e.g. corresponding to the module 250), and a fan speed control module configured to perform step S206 (e.g. corresponding to the module 260). In some embodiments, the computer system 400 may also include a mode indication module configured to perform optional step S207 of the method 200, and/or a noise indication module configured to perform optional step S208 of the method 200. In this perspective a "signal" provided to a particular module as shown in FIG. 2B may correspond to one or more input variables provided to the corresponding program module in FIG. 4. Likewise, a "signal" output from a particular module as shown in FIG. 2B may correspond to one or more output variables provided by the corresponding program module in FIG. 4.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

In summary of the present disclosure, it is provided a solution of how to overcome a problem with electric vehicles, due to a lack of a traditional internal combustion engine (ICE) making noise generated by a cooling fan more noticeable to e.g., a driver. By providing a quiet mode in which the maximum speed of the cooling fan is capped by defining a corresponding desired noise threshold, and in particular by using look-ahead road data to generate a speed profile for an upcoming section of a road such that the cooling demand for the propulsion system stays within the capabilities of the cooling fan at the capped speed, the disturbance caused by noise from the cooling fan may thus be reduced, without e.g. risking that the propulsion system overheats or similar.

The invention claimed is:

1. A method of noise management in an electric heavy vehicle, the method performed by a control system of the vehicle, and comprising:

determining a noise threshold for a cooling fan configured to provide cooling of an electric propulsion system of the vehicle, the noise threshold being lower than a rated maximum noise of the cooling fan;

determining, in response to determining the noise threshold, a target speed for the cooling fan at which a noise generated by the cooling fan does not exceed the noise threshold;

obtaining look-ahead road data pertinent to an upcoming section of a road along which the vehicle is to be driven;

determining, in response to determining the target speed and based on the look-ahead road data, a speed profile of the vehicle for the section of the road such that, with the vehicle being driven according to the speed profile, a cooling requirement of the electric propulsion system does not exceed a cooling capacity of the cooling fan running at the target speed; and while the vehicle is driven along the section of the road:
controlling the cooling fan not to exceed the target speed; and
controlling a speed of the vehicle in accordance with the speed profile.

2. The method of claim 1, wherein the method further includes obtaining an indication that the vehicle is to be operated in a dedicated quiet mode, and determining the noise threshold in response to obtaining the indication.

3. The method of claim 1, wherein the electric propulsion system is capable of braking the vehicle, and wherein controlling the speed of the vehicle according to the speed profile includes using the electric propulsion system for such braking of the vehicle.

4. The method of claim 1, wherein the method includes estimating noise generated by the cooling fan based on a dependence of generated cooling fan noise on cooling fan speed obtained from a calculation and/or lookup table.

5. The method of claim 1, wherein the method further includes, while the vehicle is driven along the section of the road, receiving a signal indicative of a measured noise level of the vehicle, and dynamically updating the speed profile of the vehicle based on at least one of the measured noise level and a change of the measured noise level over time.

6. The method of claim 1, wherein the noise threshold is a noise level within a cabin of the vehicle.

7. The method of claim 5, wherein the measured noise level is measured within the cabin.

8. The method of claim 1, wherein the noise threshold is a noise level on an outside of the vehicle.

9. The method of claim 5, wherein the measured noise level is measured on the outside of the vehicle.

10. A control system for a heavy electric vehicle, configured to:
determine a noise threshold for a cooling fan configured to provide cooling of an electric propulsion system of the vehicle, wherein the noise threshold is lower than a rated maximum noise of the cooling fan;
determine, in response to determining the noise threshold, a target speed for the cooling fan at which a noise generated by the cooling fan does not exceed the noise threshold;
obtain look-ahead road data pertinent to an upcoming section of a road along which the vehicle is to be driven;
determine, in response to determining the target speed and based on the look-ahead road data, a speed profile of the vehicle for the section of the road such that, with the vehicle being driven according to the speed profile, a cooling requirement of the electric propulsion system does not exceed a cooling capacity of the cooling fan running at the target speed; and
while the vehicle is driven along the section of the road:
control the cooling fan not to exceed the target speed; and
control a speed of the vehicle in accordance with the speed profile.

11. The control system of claim 10, further configured to obtain an indication that the vehicle is to be operated in a dedicated quiet mode, and determine the noise threshold in response to obtaining the indication.

12. A heavy electric vehicle, comprising:
an electric propulsion system;
a cooling fan configured to provide cooling of the electric propulsion system; and
the control system of claim 10.

13. A computer program product for noise management in a heavy electric vehicle, the computer program product comprising computer code that, when running on a processor device of a control system of the vehicle, causes the control system to:
determine a noise threshold for a cooling fan configured to provide cooling of an electric propulsion system of the vehicle, wherein the noise threshold is lower than a rated maximum noise of the cooling fan;
determine, in response to determining the noise threshold, a target speed for the cooling fan at which a noise generated by the cooling fan does not exceed the noise threshold;
obtain look-ahead road data pertinent to an upcoming section of a road along which the vehicle is to be driven;
determine, in response to determining the target speed and based on the look-ahead road data, a speed profile of the vehicle for the section of the road such that, with the vehicle being driven according to the speed profile, a cooling requirement of the electric propulsion system does not exceed a cooling capacity of the cooling fan running at the target speed; and
while the vehicle is driven along the section of the road:
control the cooling fan not to exceed the target speed; and
control a speed of the vehicle in accordance with the speed profile.

14. The computer program product of claim 13, wherein the computer code is further such that it, when running on the processor device of the control system, causes the control system to obtain an indication that the vehicle is to be operated in a dedicated quiet mode, and determine the noise threshold in response to obtaining the indication.

15. A non-transitory computer-readable storage medium comprising instructions, which when executed by the processor device, cause the processor device to perform the method of claim 1.

* * * * *